(12) United States Patent
Bok et al.

(10) Patent No.: US 11,511,701 B2
(45) Date of Patent: Nov. 29, 2022

(54) SYSTEM FOR PROVIDING ALARM INDICATING NON-FASTENING STATE OF SEATBELT OF VEHICLE

(71) Applicants: Hyundai Motor Company, Seoul (KR); Kia Motors Corporation, Seoul (KR)

(72) Inventors: Chang Kyu Bok, Seoul (KR); Young Rok Kim, Gyeonggi-do (KR); Jung Kyun Bong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/183,748

(22) Filed: Feb. 24, 2021

(65) Prior Publication Data
US 2022/0073029 A1    Mar. 10, 2022

(30) Foreign Application Priority Data
Sep. 10, 2020 (KR) ........................ 10-2020-0116083

(51) Int. Cl.
*B60R 22/48* (2006.01)
*B60Q 5/00* (2006.01)

(52) U.S. Cl.
CPC ............ *B60R 22/48* (2013.01); *B60Q 5/00* (2013.01); *B60R 2022/4816* (2013.01); *B60R 2022/4866* (2013.01)

(58) Field of Classification Search
CPC ........... B60R 22/48; B60R 2022/4816; B60R 2022/4866; B60R 16/023; B60R 21/01534; B60R 21/01544; B60R 21/01566; B60R 22/18; B60R 22/26; B60R 2022/1806; B60R 2022/4808; B60Q 5/00; B60Y 2400/30
See application file for complete search history.

(56) References Cited

U.S. PATENT DOCUMENTS

2009/0299577 A1* 12/2009 Demant ............ B60R 21/01546
                                                          701/45
2010/0283593 A1* 11/2010 Miller ................. B60C 23/0408
                                                          340/447
(Continued)

FOREIGN PATENT DOCUMENTS

EP      3 170 704 A2 *  5/2017  ............. B60R 22/48
KR      101305623 B1    9/2013

*Primary Examiner* — Ryan W Sherwin
(74) *Attorney, Agent, or Firm* — Fox Rothschild LLP

(57) ABSTRACT

A system for providing an alarm indicating a non-fastening state of a seatbelt of a vehicle is provided. The system includes a seatbelt part provided in a seat of the vehicle; a first controller connected in communication to the seatbelt part and configured to determine whether a buckle of the seatbelt part is fastened and a first sensor module connected to the first controller. The first sensor module includes a first transmitter configured to transmit a buckle fastening signal when the buckle is fastened. A second sensor module includes a first receiver that is configured to receive the buckle fastening signal from the first sensor module. A second controller is connected in communication to the second sensor module, and is configured to receive the buckle fastening signal and output an alarm indicating whether the seatbelt is fastened.

15 Claims, 12 Drawing Sheets

(56) References Cited

U.S. PATENT DOCUMENTS

| | | | |
|---|---|---|---|
| 2014/0277948 A1* | 9/2014 | Fujii | B60R 22/48 |
| | | | 701/45 |
| 2017/0072903 A1* | 3/2017 | Farshchi | B60R 22/48 |
| 2021/0253255 A1* | 8/2021 | Johnson | B64D 45/00 |

* cited by examiner

FIG. 6

| Shape of tunnel | Cross-section of tunnel |
|---|---|
| ▭ | ☐ |
| ⌒ | ◯ |
| ◯ | △ |

SYSTEM FOR PROVIDING ALARM INDICATING NON-FASTENING STATE OF SEATBELT OF VEHICLE

CROSS REFERENCE TO RELATED APPLICATION

The present application claims priority to Korean Patent Application No. 10-2020-0116083, filed on Sep. 10, 2020 the entire contents of which is incorporated herein for all purposes by this reference.

BACKGROUND

1. Field of the Disclosure

The present disclosure relates to a system for providing an alarm indicating a non-fastening state of a seatbelt of a vehicle and, more particularly, to a system for providing an alarm indicating a non-fastening state of a seatbelt of a vehicle, which wirelessly identifies whether a seatbelt is fastened and outputs an alarm when the seatbelt is not fastened.

2. Description of the Prior Art

Existing systems for providing a warning that seatbelts are not fastened are commonly connected to front seats of vehicles in a wired manner. Specifically, the vehicle seatbelt fastening waning device or the prior art is provided on a seat to detect the weight distribution of a person sitting on the seat, for example, and the electric flow thereof, thereby detecting whether the buckle of the seatbelt is fastened. Accordingly, the device determines whether the buckle of the seatbelt is fastened according to the weight of a person or an animal, except for objects from which no conductivity is detected, and issues a warning if the same is not fastened.

However, conventional systems for determining whether seatbelts are fastened in a wired manner may have difficulty in making such determinations based on wired processing when it is necessary to confirm whether all seatbelts are fastened, or when seats are freely moved and thus deform the space, as in the case of an autonomous driving vehicle. Therefore, there is a need for development of a system capable of wirelessly determining whether a seatbelt is fastened and providing a notification of the determination.

SUMMARY

The present disclosure has been proposed to solve the above-mentioned problems, and provides a system for providing an alarm indicating a non-fastening state of a seatbelt of a vehicle, wherein the system confirms whether seatbelts of all seats of the vehicle are fastened in a wireless manner, and provides an alarm if the same are not fastened.

A system for providing an alarm indicating a non-fastening state of a seatbelt of a vehicle according to the present disclosure may include: a seatbelt part provided in a seat of the vehicle; a first controller connected in communication to the seatbelt part and configured to determine whether a buckle of the seatbelt part is fastened; a first sensor module connected to the first controller and including a first transmitter configured to transmit a buckle fastening signal when the buckle is fastened; a second sensor module including a first receiver configured to receive the buckle fastening signal from the first sensor module; and a second controller connected in communication to the second sensor module, and configured to receive the buckle fastening signal and to output an alarm regarding whether the seatbelt is fastened.

The system may further include: a seat rail, on which the seat is mounted; and a tunnel part disposed adjacent to the seat rail, provided with the first sensor module and the second sensor module in the interior thereof, and having a tunnel shape. A slit hole may be formed on an upper surface of one side of the tunnel part in a lengthwise direction of the tunnel part.

The system may further include: a first connection member disposed in the interior of the tunnel part and on which one of the first sensor module or the second sensor module is mounted; and a second connection member, one side (e.g., a first side) of which may be coupled to a seat frame and an opposite side (e.g., a second side) of which may be coupled to one side of the first connection member through the slit hole of the tunnel part. The first sensor module may further include a second receiver configured to receive the buckle fastening signal, the second sensor module may further include a second transmitter configured to transmit the buckle fastening signal, and the first transmitter and the second receiver may be disposed in parallel to each other, and the first transmitter may be disposed closer to the outer side of the first sensor module than the second receiver.

A partition wall may be provided disposed the first transmitter and the second receiver. The first transmitter and the second receiver may be disposed on the upper and lower sides. The second receiver may be disposed to be surrounded by a plurality of first transmitters.

The system may further include: a third controller connected in communication to the seatbelt part and configured to determine whether the buckle of the seatbelt part is fastened; a third sensor module connected to the third controller and including a third transmitter configured to transmit the buckle fastening signal when the buckle is fastened; and a fourth sensor module including a third receiver configured to receive the buckle fastening signal from the third sensor module.

The first sensor module and the fourth sensor module may be disposed in the interior of the tunnel part in parallel to each other, the second sensor module and the third sensor module may be disposed in the interior of the tunnel part in parallel to each other, the first sensor module and the second sensor module may be spaced apart from each other by a predetermined distance to face each other, and the third sensor module and the fourth sensor module may be spaced apart from each other by a predetermined distance to face each other.

The first sensor module and the fourth sensor module may be disposed on the upper and lower sides, the second sensor module and the third sensor module may be disposed on the upper and lower sides, the first sensor module and the second sensor module may be spaced apart from each other by a predetermined distance to face each other, and the third sensor module and the fourth sensor module may be spaced apart from each other by a predetermined distance to face each other. The first sensor module and the second sensor module may be infrared ray sensors.

The system may further include an alarm unit configured to receive the buckle fastening signal from the second controller and output a notification of whether the seatbelt is fastened. The tunnel part may be located on a side surface of the seat rail, and may be disposed adjacent to the seat rail. The tunnel part may be formed in a shape of a straight line, a curve, a circle, or an ellipse. The cross-section of the tunnel part may have a polygonal or circular shape.

According to the present disclosure, it may be possible to more easily confirm whether seatbelts of all seatbelts are fastened, and even when seats are freely moved and thus deform the space, as in the case of an autonomous driving vehicle, it may be possible to more easily confirm whether seatbelts are fastened and to provide an alarm accordingly.

BRIEF DESCRIPTION OF THE DRAWINGS

The above and other aspects, features and advantages of the present disclosure will be more apparent from the following detailed description taken in conjunction with the accompanying drawings, in which:

FIG. 6 is a view illustrating the shape and the cross-section of the tunnel part, in the system for providing an alarm indicating a non-fastening state of a seatbelt of a vehicle, according to the exemplary embodiment of the present disclosure;

DETAILED DESCRIPTION

Figure 1:
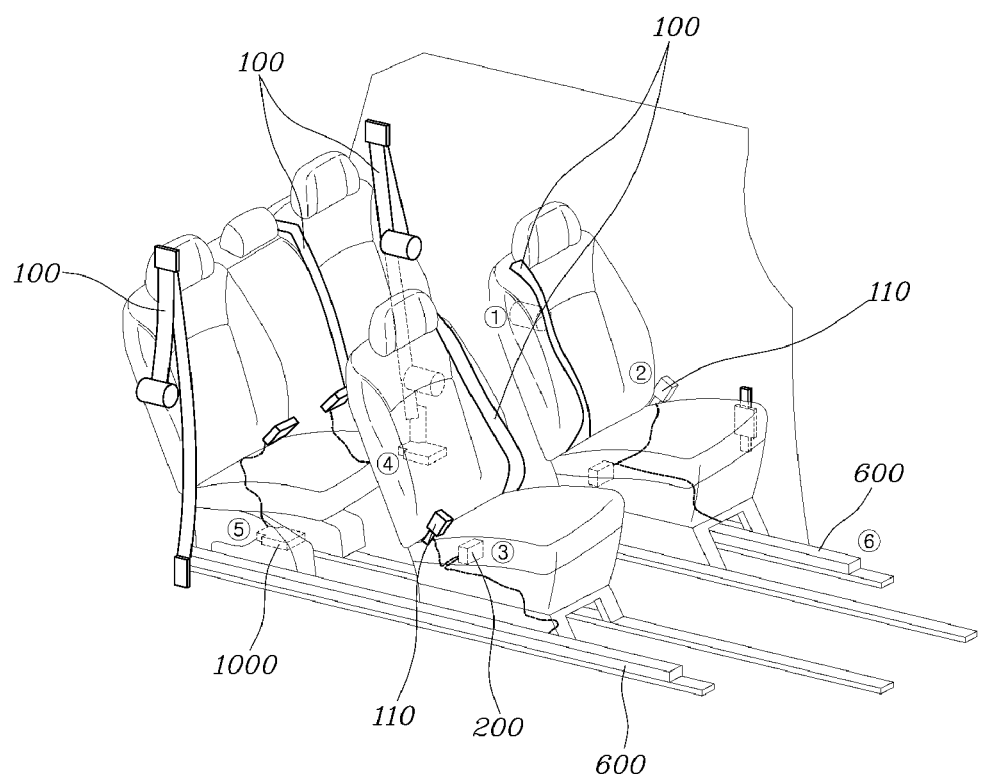
FIG. 1 is a view illustrating an interior state of a vehicle, in which a system for providing an alarm indicating a non-fastening state of a seatbelt of the vehicle is realized, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a system for providing an alarm indicating a non-fastening state of a seatbelt of a vehicle according to an exemplary embodiment of the present disclosure will be described with reference to the accompanying drawings.

Figure 2:
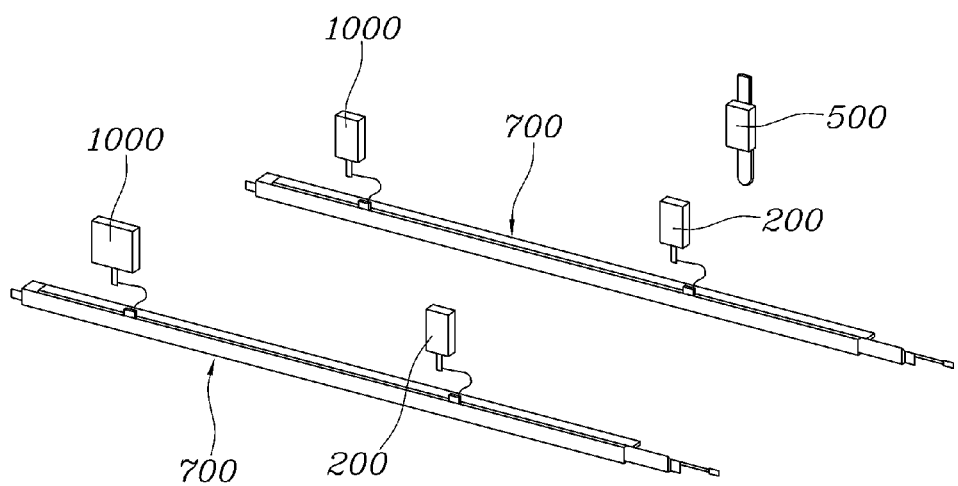
FIG. 2 is a view schematically illustrating a configuration the system for providing an alarm indicating a non-fastening state of a seatbelt of a vehicle according to the exemplary embodiment of the present disclosure.

Referring to FIGS. 1 and 2, the system for providing an alarm indicating a non-fastening state of a seat belt of a vehicle according to an exemplary embodiment of the present disclosure may include a seatbelt part 100, a first controller 200, a first sensor module 300, a second sensor module 400, and a second controller 500, and may further include a seat rail 600, a tunnel part 700, a third sensor module 1100, a fourth sensor module 1200, a third controller 1000, and an alarm unit.

The seatbelt part 100 is a seatbelt provided in a seat of the vehicle, and may be seatbelts provided in multiple seats located in a first row and a second row within the vehicle including two rows of seats as illustrated in FIG. 1 according to the exemplary embodiment. The seatbelt part 100 may be seatbelts provided in seats located in respective rows of seats when the rows of the seats are differently configured according to another exemplary embodiment.

Figure 3:
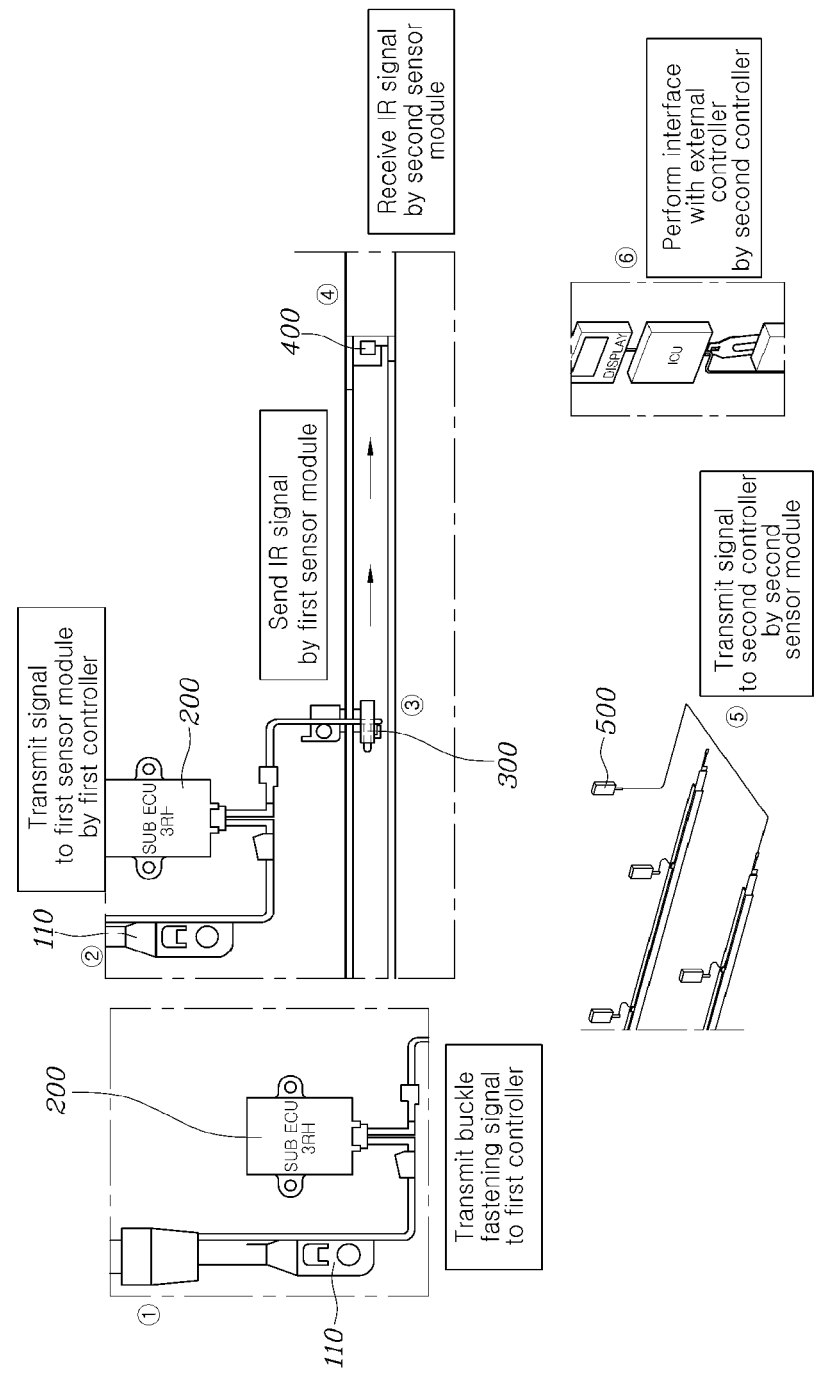
FIG. 3 is a view illustrating an operational principle of the system for providing an alarm indicating a non-fastening state of a seatbelt of a vehicle according to the exemplary embodiment of the present disclosure.

The first controller 200 may be connected in communication to the seatbelt part 100, and may be configured to determine whether a buckle 110 of the seatbelt part 100 is fastened. In particular, an aspect in which the first controller 200 is connected in communication to the seatbelt part 100 may indicate that the seatbelt part 100 and the first controller 200 are connected to each other via wiring as illustrated in FIG. 3, and a buckle fastening signal may be delivered to the first controller 200 in response to determining that the buckle 110 of the seatbelt 100 is fastened. When the buckle fastening signal is delivered to the first controller 200, the first controller 200 may be configured to determine that the buckle 110 of the seatbelt part 100 is fastened.

Figure 4:
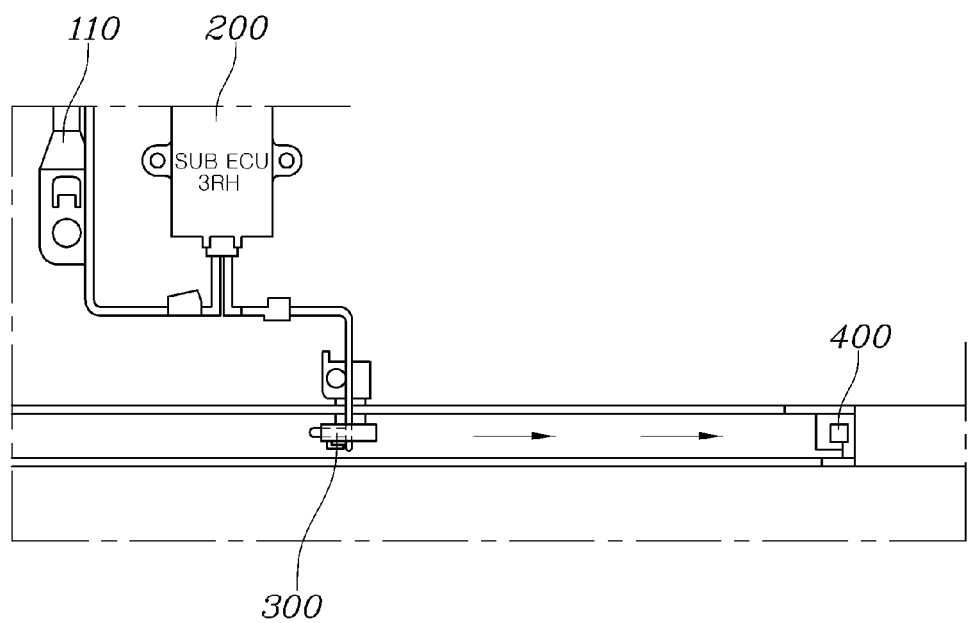
FIG. 4 is a view illustrating a state in which a buckle fastening signal is transmitted from a first sensor module to a second sensor module, in the system for providing an alarm indicating a non-fastening state of a seatbelt of a vehicle according to the exemplary embodiment of the present disclosure.

Referring to FIGS. 3 and 4, the first sensor module 300 may be connected to the first controller 200, and may be configured to transmit a buckle fastening signal in response to determining that the buckle 110 is fastened. According to the exemplary embodiment, the first sensor module 300 may include a first transmitter 310 configured to transmit a buckle fastening signal, and may further include a second receiver 320 configured to receive the buckle fastening signal. The second sensor module 400 may be configured to receive the buckle fastening signal from the first sensor module 300. According to the exemplary embodiment, the second sensor module 400 may include a first receiver 410 configured to receive a buckle fastening signal, and may further include a second transmitter 420 configured to transmit the buckle fastening signal.

Meanwhile, according to the exemplary embodiment, the first sensor module 300 and the second sensor module 400 may be infrared ray sensors. In this way, according to the present disclosure, since infrared ray sensors may be used for the first sensor module 300 and the second sensor module 400, a signal that indicates whether the buckle 110 of the seatbelt part 100 is fastened may be wirelessly transmitted and received, and a signal may be transmitted and received not always but only when an event, such as fastening of the buckle 110, occurs as in a wireless communication such as a radio frequency identification (RFID) communication scheme or a Bluetooth low energy (BLE) scheme, whereby the power consumptions of the sensor modules are low, a complex fail-safety logic is not necessary, and disturbance or obstruction of communication by other signals is not caused. The second controller 500 may be connected in communication to the second sensor module 400, and may be configured to receive a buckle fastening signal and output an alarm that indicates whether the seatbelt is fastened.

In a description of an operational principle of the system for providing an alarm indicating a non-fastening state of the seatbelt of a vehicle according to the exemplary embodiment of the present disclosure with reference to FIG. 3, first, a buckle fastening signal of the seatbelt part 100 may be delivered to the first controller 200 in response to determining that the buckle 110 of the seatbelt part 100 is fastened, the first controller 200 may be configured to operate the transmitter of the first sensor module 300 to transmit an infrared ray signal, the second sensor module 400 may be configured to receive the infrared ray signal via the first receiver 410, and the second controller 500 may be configured to deliver the buckle fastening signal to an external controller (not illustrated) to cause the alarm unit to output an alarm that indicates a non-fastening state of the seatbelt.

Figure 5:
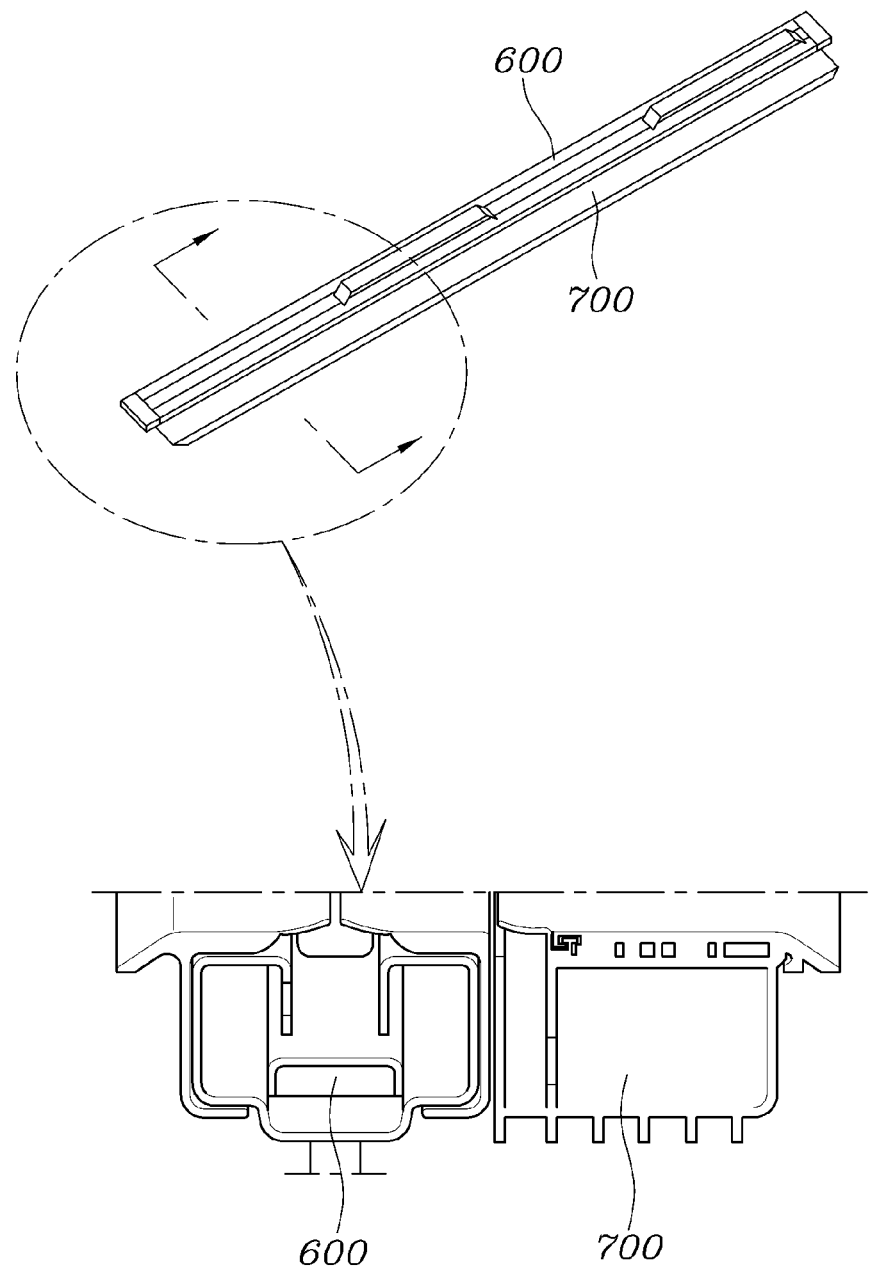
FIG. 5 is a view illustrating a seat rail and a tunnel part, in the system for providing an alarm indicating a non-fastening state of a seatbelt of a vehicle, according to the exemplary embodiment of the present disclosure.

The seat rail 600 is a rail, on which a seat is mounted, and the seat may be moved forwards or rearwards via the seat rail 600 and according to an exemplary embodiment, the seat may be rotated on the seat rail 600. The tunnel part 700 may be coupled to the seat rail 600 as a separate object from the seat rail 600 as illustrated in FIG. 5, according to an exemplary embodiment. In particular, the tunnel part 700 may be located on a side surface of the seat rail 600, and may be disposed adjacent to the seat rail 600. According to another exemplary embodiment, the tunnel part 700 may be integrally formed with the seat rail 600.

Further, as illustrated in FIGS. 3 and 4, the first sensor module 300 and the second sensor module 400 may be disposed in the interior of the tunnel part 700. In addition, the tunnel part 700 may have a tunnel shape to prevent other signals, except for an infrared ray signal, from being introduced, thereby improving the signal transmission/reception performances of the first sensor module 300 and the second sensor module 400. Generally, an infrared ray sensor may cause disturbance of data in an environment, in which light is introduced, and to prevent the above problem, according to the present disclosure, disturbance of data and obstruction of communication may be prevented by forming the tunnel part 700 provided with the first sensor module 300 and the second sensor module 400 in a tunnel shape to prevent introduction of external signals.

Figure 6:
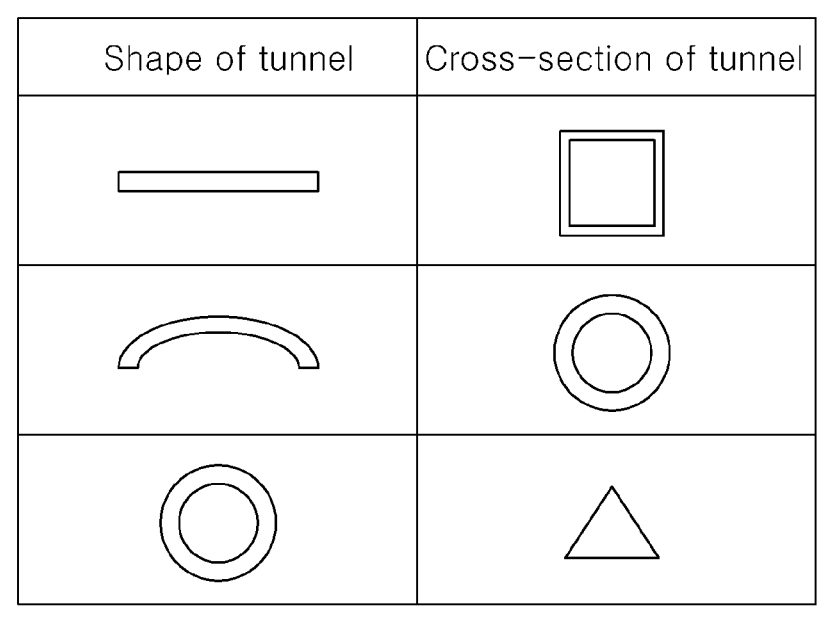

Referring to FIG. 6, according to the exemplary embodiment, the tunnel part 700 may have a shape of a straight line, a curved circle, or an ellipse, and the cross-section of the tunnel part 700 may have a polygonal shape, including a triangular shape and a rectangular shape, and a circular shape. However, this is merely an exemplary embodiment, and as long as other external signals may be prevented from being introduced into the tunnel part 700, various other shapes may be employed as the shape of the tunnel part 700 of the present disclosure.

Figure 7:
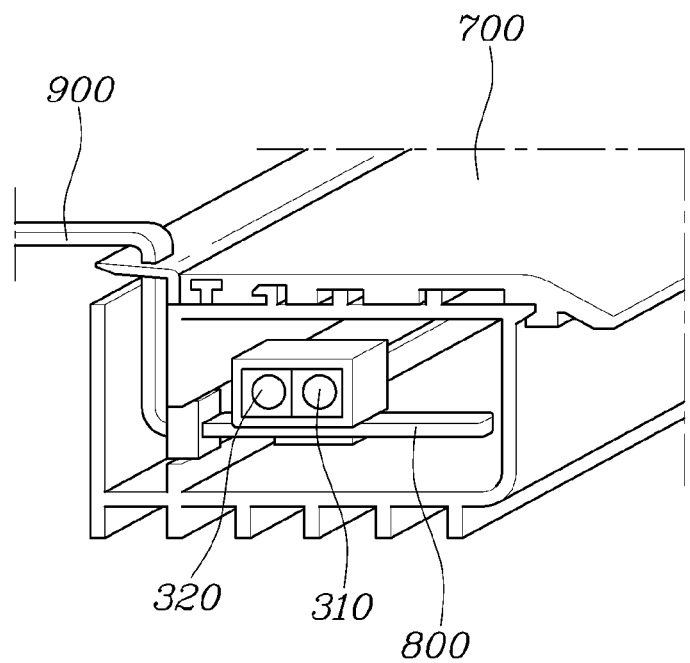
FIG. 7 is a view illustrating the first sensor module provided in the tunnel part, in the system for providing an alarm indicating a non-fastening state of a seatbelt of a vehicle, according to the exemplary embodiment of the present disclosure.

Hereinafter, the first sensor module 300 will be described in more detail with reference to FIGS. 7 to 9. According to the exemplary embodiment, the first sensor module 300, as illustrated in FIG. 7, may include a first transmitter 310 configured to transmit a buckle fastening signal and a second receiver 320 configured to receive the buckle fastening signal, and in particular, the first transmitter 310 and the second receiver 320 may be disposed in parallel as illustrated in FIG. 7, and the first transmitter 310, as illustrated in FIG. 9, may be disposed closer to the outer side of the first sensor module 300 than the second receiver 320. Particularly, the first transmitter 310 may be disposed closer to the outer side of the first sensor module 300 than the second receiver 320 because a signal transmitted by the first transmitter 310 may be prevented from being received by the second receiver 320.

Further, as illustrated in FIG. 9, a partition wall 330 may be disposed between the first transmitter 310 and the second receiver 320 in the first sensor module 300. In particular, the partition wall 330 may be disposed between the first transmitter 310 and the second receiver 320 to prevent a signal transmitted by the first transmitter 310 from being received by the second receiver 320. Although not illustrated in the drawings, the first sensor module 300 may be provided with only a transmitter according to another exemplary embodiment. In particular, only one transmitter or a plurality of transmitters may be provided.

Figure 8:
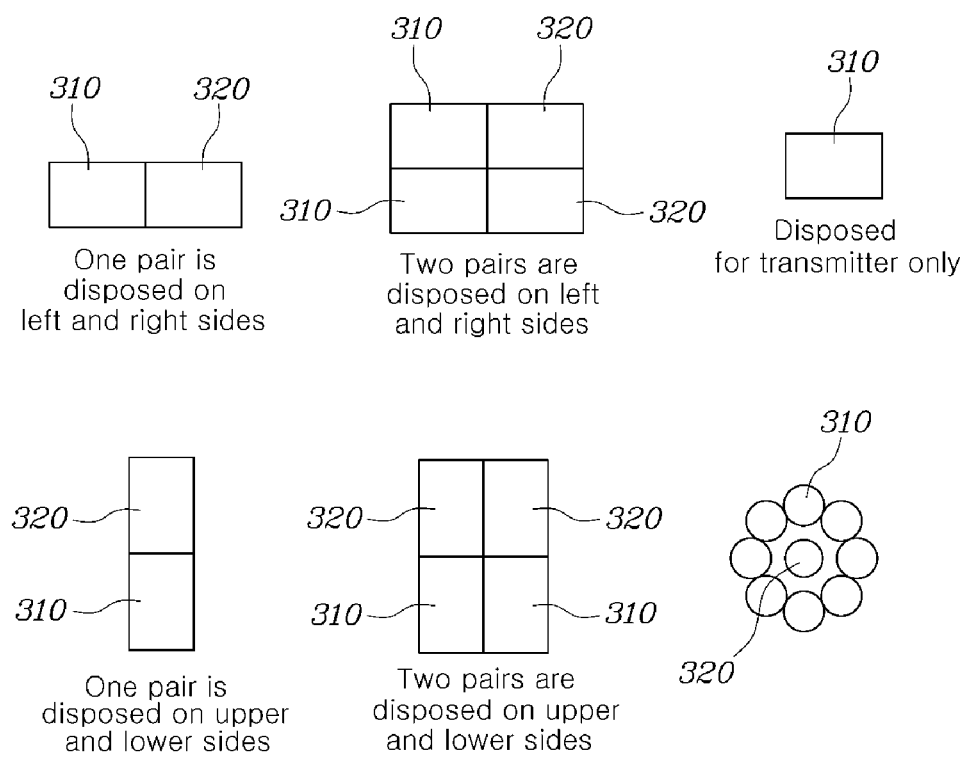
FIG. 8 is a view illustrating an arrangement relationship between a first transmitter and a second receiver of the first sensor module provided in the tunnel part, in the system for providing an alarm indicating a non-fastening state of a seatbelt of a vehicle, according to the exemplary embodiment of the present disclosure.
Figure 9:
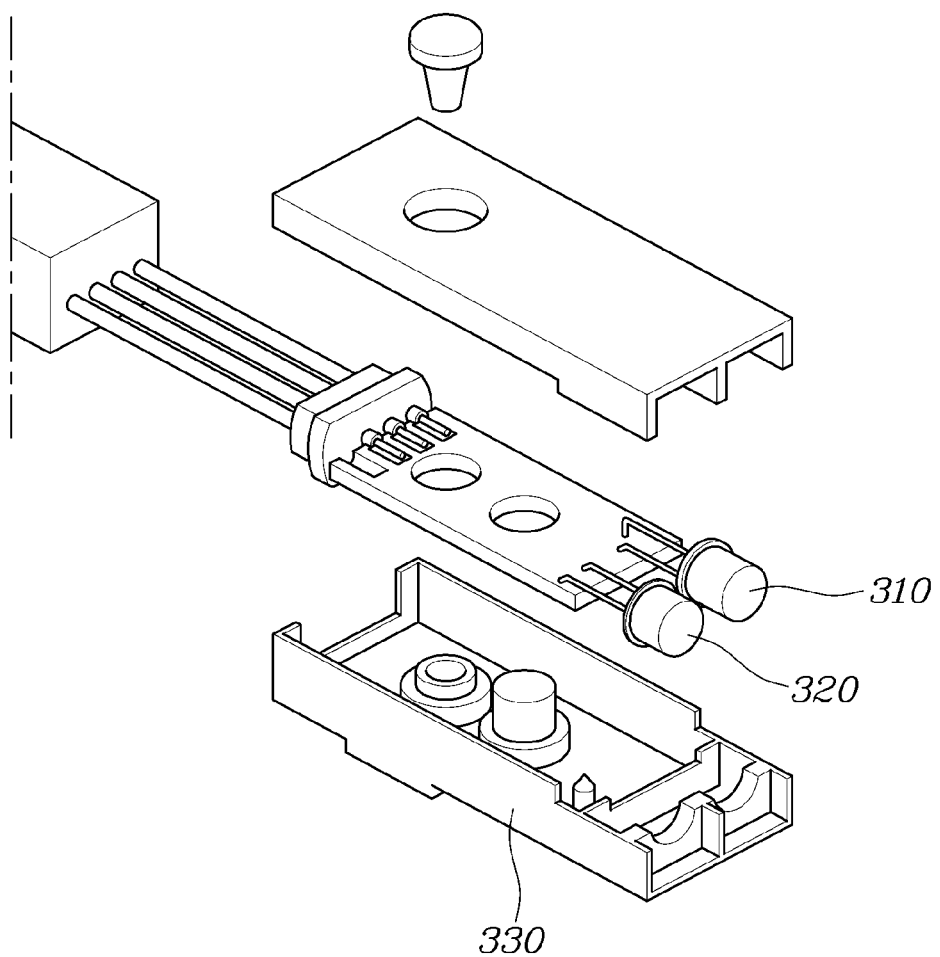
FIG. 9 is an exploded perspective view of the first sensor module, in the system for providing an alarm indicating a non-fastening state of a seatbelt of a vehicle, according to the exemplary embodiment of the present disclosure.

Meanwhile, referring to FIG. 8, one pair of a first transmitter 310 and a second receiver 320 of the first sensor module 300 may be disposed in parallel on the left and right sides, two pairs of first transmitters 310 and second receivers 320 of the first sensor module 300 may be disposed in parallel on the left and right sides, one pair of a first transmitter 310 and a second receiver 320 of the first sensor module 300 may be disposed on the upper and lower sides, two pairs of first transmitters 310 and second receivers 320 of the first sensor module 300 may be disposed on the upper and lower sides, and the second receiver 320 may be surrounded by a plurality of first transmitters 310. However, this is merely an example, and the numbers of the transmitters and the receivers provided in the first sensor module 300 and an arrangement relationship of the transmitters and the receivers may be changed according to the signal transmission/reception environment of the system.

The third controller 1000 may be connected in communication to the seatbelt part 100, and may be configured to determine whether a buckle 110 of the seatbelt part 100 is fastened. In particular, the seatbelt part 100 connected to the third controller 1000 may be provided in a seat located in a different row from the seat provided with the seatbelt part 100 connected to the first controller 200. For example, in a vehicle provided with two rows of seats, the first controller 200 may be configured to determine whether the buckle 110 of the seatbelt part 100 of the seat provided in the first row is fastened, and the third controller 1000 may be configured to determine whether the buckle 110 of the seatbelt part 100 of the seat provided in the second row is fastened.

Further, an aspect in which the third controller 1000 is connected in communication to the seatbelt part 100 may indicate that the seatbelt part 100 and the third controller 1000 are connected to each other via wiring, and a buckle fastening signal may be delivered to the third controller 1000 in response to determining that the buckle 110 of the seatbelt 100 is fastened. When the buckle fastening signal is delivered to the third controller 1000, the first controller 200 may be configured to determine that the buckle 110 of the seatbelt part 100 is fastened.

The third sensor module 1000 may connected to the third controller 1000, and may be configured to transmit a buckle fastening signal when the buckle 110 is fastened. According to the exemplary embodiment, the third sensor module 1100 may include a third transmitter 1110 configured to transmit a buckle fastening signal, and may further include a fourth receiver 1120 configured to receive the buckle fastening signal. The fourth sensor module 1200 may be configured to receive the buckle fastening signal from the third sensor module 1100. According to the exemplary embodiment, the fourth sensor module 1200 may include a third receiver 1210 configured to receive a buckle fastening signal, and may further include a fourth transmitter 1220 configured to transmit the buckle fastening signal. The third sensor module 1100 and the fourth sensor module 1200 according to the present disclosure may be infrared ray sensors, like the first sensor module 300 and the second sensor module 400.

Figure 10:
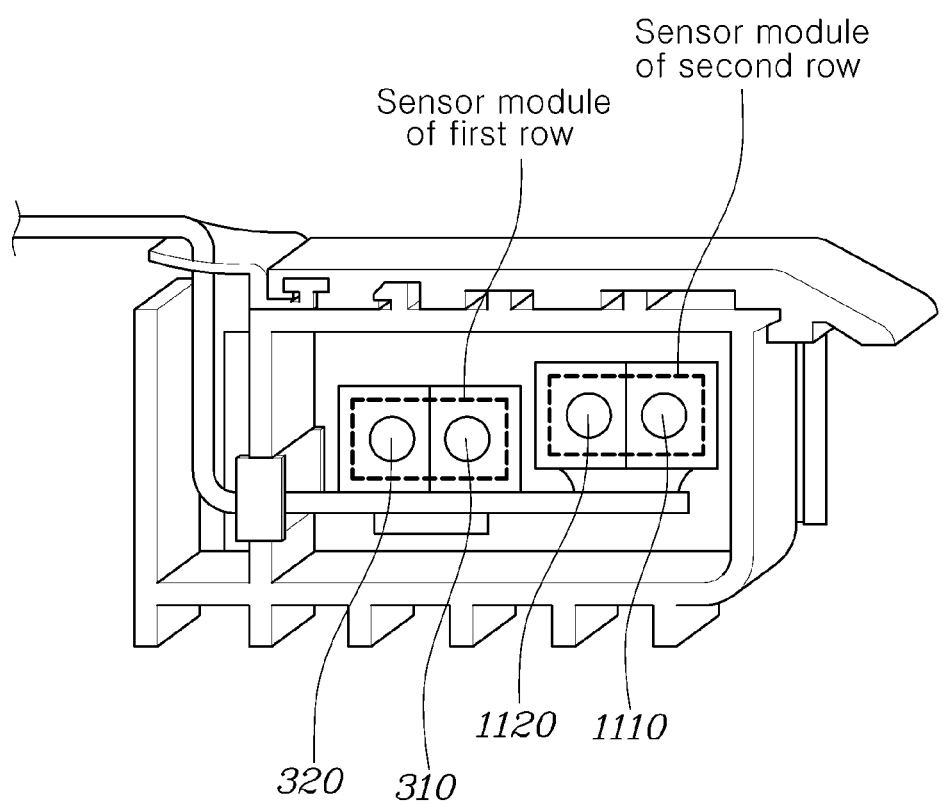
FIGS. 10 and 11 are views illustrating an arrangement relationship between the first sensor module and a fourth sensor module, in the system for providing an alarm indicating a non-fastening state of a seatbelt of a vehicle, according to the exemplary embodiment of the present disclosure.
Figure 11:
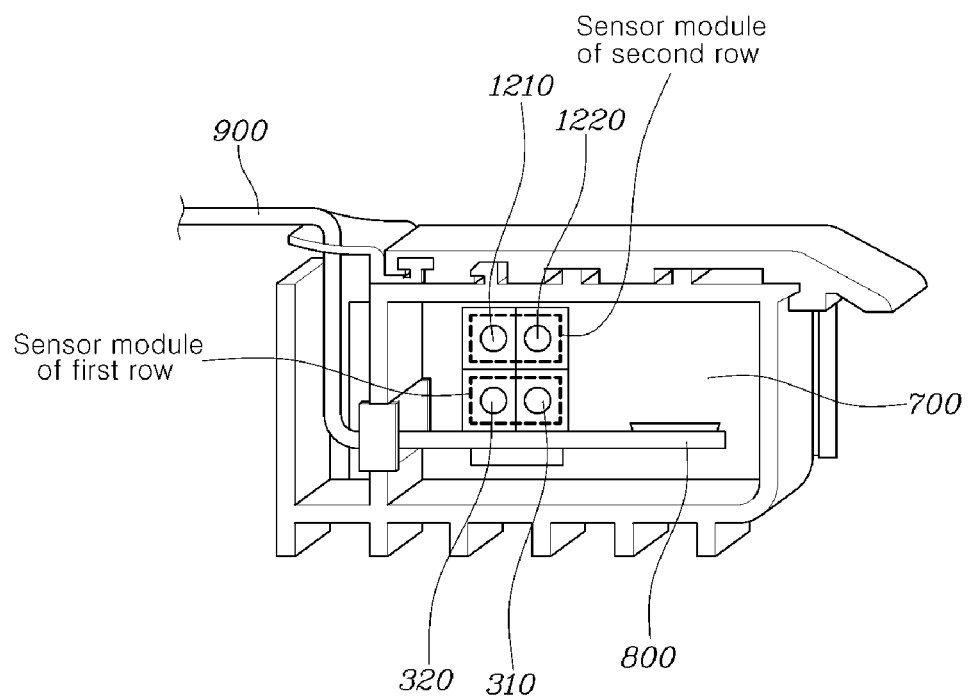

Meanwhile, referring to FIGS. 10 and 11, the spatial utility of the tunnel part 700 may be increased by disposing sensor modules of two seats located in different rows in one tunnel part 700. In particular, according to the exemplary embodiment, referring to FIG. 10, the first sensor module 300 and the fourth sensor module 1200 may be disposed in the interior of the tunnel part 700 in parallel to each other, the second sensor module 400 and the third sensor module 1100 may be disposed in the interior of the tunnel part 700 in parallel to each other, the first sensor module 300 and the second sensor module 400 may be spaced apart from each other by a predetermined distance to face each other, and the third sensor module 1100 and the fourth sensor module 1200 may be spaced apart from each other by a predetermined distance to face each other.

In this way, the first sensor module 300 and the fourth sensor module 1200 may be disposed in the interior of the tunnel part 700 in parallel to each other and the second sensor module 400 and the third sensor module 1100 may be disposed in the interior of the tunnel part 700 in parallel to each other, whereby a signal transmitted by the first sensor module 300 may be prevented from being interrupted by the fourth sensor module 1200 and a signal transmitted by the third sensor module 300 may be prevented from being interrupted by the second sensor module 400.

According to another exemplary embodiment, referring to FIG. 11, the first sensor module 300 and the fourth sensor module 1200 may be disposed on the upper and lower sides, the second sensor module 400 and the third sensor module 1100 may be disposed on the upper and lower sides, the first sensor module 300 and the second sensor module 400 may be spaced apart from each other by a predetermined distance to face each other, and the third sensor module 1100 and the fourth sensor module 1200 may be spaced apart from each other by a predetermined distance to face each other.

In this way, the first sensor module 300 and the fourth sensor module 1200 may be disposed on the upper and lower sides and the second sensor module 400 and the third sensor module 1100 may be disposed on the upper and lower sides, whereby a signal transmitted by the first sensor module 300 may be prevented from being interrupted by the fourth sensor module 1200 and a signal transmitted by the third sensor module 1100 may be prevented from being interrupted by the second sensor module 400.

Figure 12:
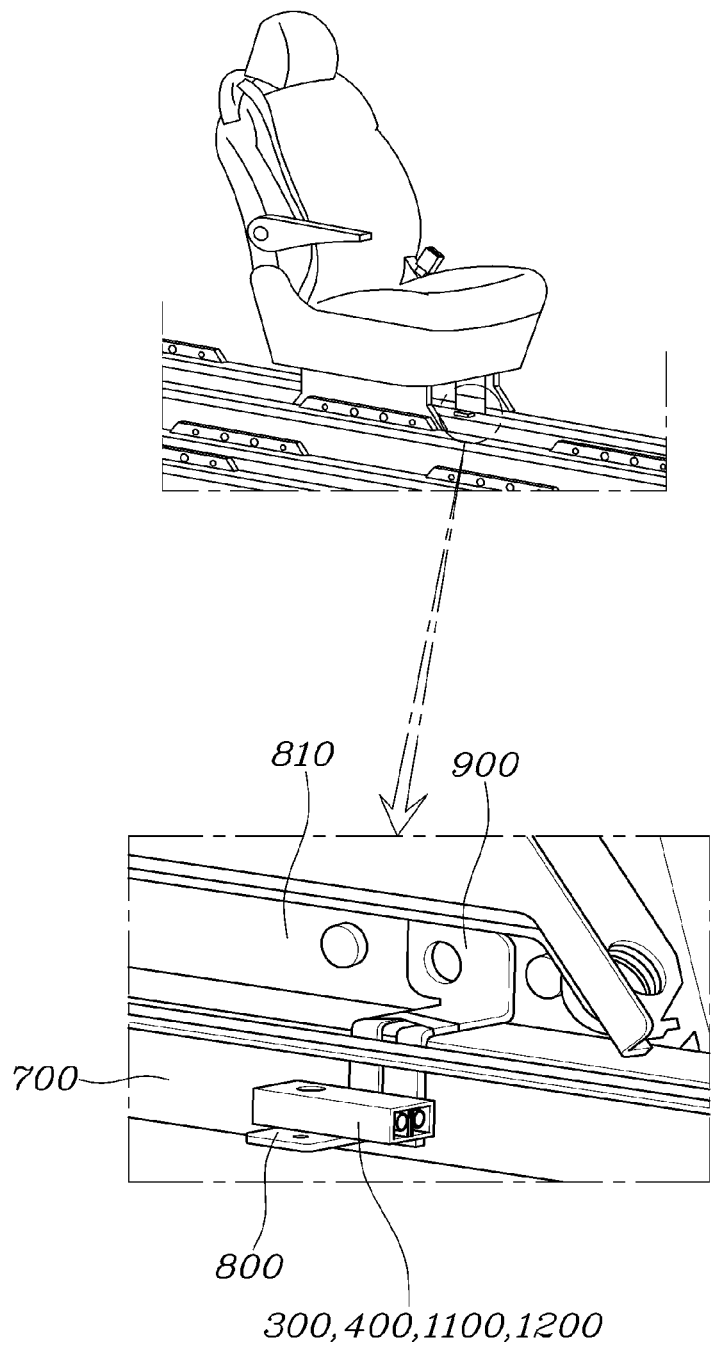
FIG. 12 is a view illustrating a state in which a sensor module is moved together when a seat is moved forwards and rearward, in the system for providing an alarm indicating a non-fastening state of a seatbelt of a vehicle, according to the exemplary embodiment of the present disclosure.

Meanwhile, referring to FIG. 12, a slit hole may be formed on the upper surface of one side of the tunnel part 700 in the lengthwise direction of the tunnel part 700. Further, the system for providing an alarm indicating a non-fastening state of a seatbelt of a vehicle according to the present disclosure may further include a first connection member 800 disposed in the interior of the tunnel part 700 and on which at least one of the first sensor module 300 or the second sensor module 400 may be mounted at an upper portion thereof, and a second connection member 900, one or first side of which may be coupled to a seat frame 810 and an opposite or a second side of which may be coupled to one side of the first connection member 800 through the slit hole of the tunnel part 700.

Accordingly, when the seat is moved forwards or rearwards via the first connection member 800 and the second connection member 900, the sensor module may also be moved in the tunnel part 700 along the slit hole together with the seat, whereby the degree of freedom of movement of the seat may be improved. The alarm unit may be configured to receive a buckle fastening signal from the second controller 500 and output a notification regarding whether the seatbelt is fastened. Further, the alarm unit may be configured receive a buckle fastening signal from the fourth controller and provide a notification indicating whether the seatbelt is fastened. According to the exemplary embodiment, the alarm unit may be configured to output a notification to a driver of whether a seatbelt is fastened via a cluster, an audio video navigation (AVN) device, or a speaker. However, this is merely an exemplary embodiment, and as long as a buckle fastening signal may be delivered from the fourth controller and whether the seatbelt is fastened may be provided in a notification to the driver, other configurations may be used as the alarm unit of the present disclosure.

What is claimed is:

1. A system for providing an alarm indicating a non-fastening state of a seatbelt of a vehicle, comprising:
   a seatbelt part provided within a seat of the vehicle;
   a first controller connected in communication to the seatbelt part and configured to determine whether a buckle of the seatbelt part is fastened;
   a first sensor module connected to the first controller and including a first transmitter configured to transmit a buckle fastening signal in response to detecting that the buckle is fastened;
   a second sensor module including a first receiver configured to receive the buckle fastening signal from the first sensor module;
   a second controller connected in communication to the second sensor module, and configured to receive the buckle fastening signal and to output an alarm indicating whether the seatbelt is fastened;
   a seat rail, on which the seat is mounted; and
   a tunnel part disposed adjacent to the seat rail, including the first sensor module and the second sensor module in the interior thereof, and having a tunnel shape.

2. The system of claim 1, wherein a slit hole is formed on an upper surface of one side of the tunnel part in a lengthwise direction of the tunnel part.

3. The system of claim 2, further comprising:
   a first connection member disposed in the interior of the tunnel part and on which one of the first sensor module or the second sensor module is mounted; and
   a second connection member, a first side of which is coupled to a seat frame and a second side of which is coupled to one side of the first connection member through the slit hole of the tunnel part.

4. The system of claim 1, wherein the first sensor module includes a second receiver configured to receive the buckle fastening signal, the second sensor module includes a second transmitter configured to transmit the buckle fastening signal, and the first transmitter and the second receiver are disposed in parallel to each other, and the first transmitter is disposed closer to the outer side of the first sensor module than the second receiver.

5. The system of claim 4, wherein a partition wall is provided between the first transmitter and the second receiver.

6. The system of claim 4, wherein the first transmitter and the second receiver are disposed on the upper and lower sides of the tunnel part.

7. The system of claim 4, wherein the second receiver is disposed to be surrounded by a plurality of first transmitters.

8. The system of claim 1, wherein the first sensor module and the second sensor module are infrared ray sensors.

9. The system of claim 1, further comprising:
   an alarm unit configured to receive the buckle fastening signal from the second controller and output a notification indicating whether the seatbelt is fastened.

10. The system of claim 1, wherein the tunnel part is disposed on a side surface of the seat rail, and adjacent to the seat rail.

11. The system of claim 1, wherein the tunnel part is formed in a shape of a straight line, a curve, a circle, or an ellipse.

12. The system of claim 1, wherein the cross-section of the tunnel part has a polygonal or circular shape.

13. A system for providing an alarm indicating a non-fastening state of a seatbelt of a vehicle, comprising:
   a seatbelt part provided within a seat of the vehicle;
   a first controller connected in communication to the seatbelt part and configured to determine whether a buckle of the seatbelt part is fastened;
   a first sensor module connected to the first controller and including a first transmitter configured to transmit a buckle fastening signal in response to detecting that the buckle is fastened;
   a second sensor module including a first receiver configured to receive the buckle fastening signal from the first sensor module;
   a second controller connected in communication to the second sensor module, and configured to receive the buckle fastening signal and to output an alarm indicating whether the seatbelt is fastened;
   a third controller connected in communication to the seatbelt part and configured to determine whether the buckle of the seatbelt part is fastened;
   a third sensor module connected to the third controller and including a third transmitter configured to transmit the buckle fastening signal in response to detecting that the buckle is fastened; and
   a fourth sensor module including a third receiver configured to receive the buckle fastening signal from the third sensor module.

14. The system of claim 13, wherein the first sensor module and the fourth sensor module are disposed in the interior of the a tunnel part in parallel to each other, the second sensor module and the third sensor module are disposed in the interior of the tunnel part in parallel to each other, the first sensor module and the second sensor module are spaced apart from each other by a predetermined distance to face each other, and the third sensor module and the fourth sensor module are spaced apart from each other by a predetermined distance to face each other.

15. The system of claim 13, wherein the first sensor module and the fourth sensor module are disposed on the upper and lower sides of a tunnel part, the second sensor module and the third sensor module are disposed on the upper and lower sides, the first sensor module and the second sensor module are spaced apart from each other by a predetermined distance to face each other, and the third sensor module and the fourth sensor module are spaced apart from each other by a predetermined distance to face each other.

* * * * *